(12) United States Patent
Janakiraman et al.

(10) Patent No.: US 8,683,373 B2
(45) Date of Patent: Mar. 25, 2014

(54) ORGANIZING FILES BASED ON DOWNLOAD LOCATIONS

(75) Inventors: Janani Janakiraman, Austin, TX (US); Basu Viadyanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1526 days.

(21) Appl. No.: 11/456,230

(22) Filed: Jul. 10, 2006

(65) Prior Publication Data

US 2008/0010599 A1    Jan. 10, 2008

(51) Int. Cl.
*G06F 3/00*    (2006.01)

(52) U.S. Cl.
USPC .......................................... 715/776

(58) Field of Classification Search
USPC .......................... 715/775, 776, 835
See application file for complete search history.

(56) References Cited

U.S. PATENT DOCUMENTS

| | | | |
|---|---|---|---|
| 6,408,434 B1 | 6/2002 | Fujiwara | |
| 6,714,951 B2 | 3/2004 | Bills et al. | |
| 6,775,665 B1 * | 8/2004 | Piersol | 707/4 |
| 6,941,302 B1 | 9/2005 | Suchter | |
| 6,961,751 B1 | 11/2005 | Bates et al. | |
| 7,149,959 B1 * | 12/2006 | Jones et al. | 715/234 |
| 7,890,667 B2 * | 2/2011 | Wakazono et al. | 710/15 |
| 2002/0067381 A1 | 6/2002 | Hugh | |
| 2004/0068723 A1 | 4/2004 | Graupner et al. | |
| 2005/0097041 A1 | 5/2005 | Campbell et al. | |
| 2005/0108157 A1 * | 5/2005 | Bushman et al. | 705/40 |
| 2006/0206791 A1 * | 9/2006 | Komamura et al. | 715/500 |

FOREIGN PATENT DOCUMENTS

| | | |
|---|---|---|
| JP | 11265335 A | 9/1999 |
| JP | 2004021532 A | 1/2004 |
| JP | 2004254034 A | 9/2004 |
| JP | 2005149072 A | 6/2005 |
| JP | 2005228270 A | 8/2005 |
| JP | 2005353038 A | 12/2005 |
| JP | 2006119757 A | 5/2006 |
| WO | WO2004088943 A2 | 10/2004 |

\* cited by examiner

*Primary Examiner* — Thanh Vu
(74) *Attorney, Agent, or Firm* — Yee & Associates, P.C.; Jeffrey S. LaBaw

(57) ABSTRACT

A computer implemented method, apparatus and computer usable program code for managing files. A set of origination locations for a plurality of files is identified to form a set of identified origination locations in response to a request to view the plurality of files. Each origination location in the set of identified origination locations identifies a location from which a file in the plurality of files has been received. A representation of the plurality of files is presented using a set of graphical indicators based on the set of identified origination locations.

20 Claims, 5 Drawing Sheets

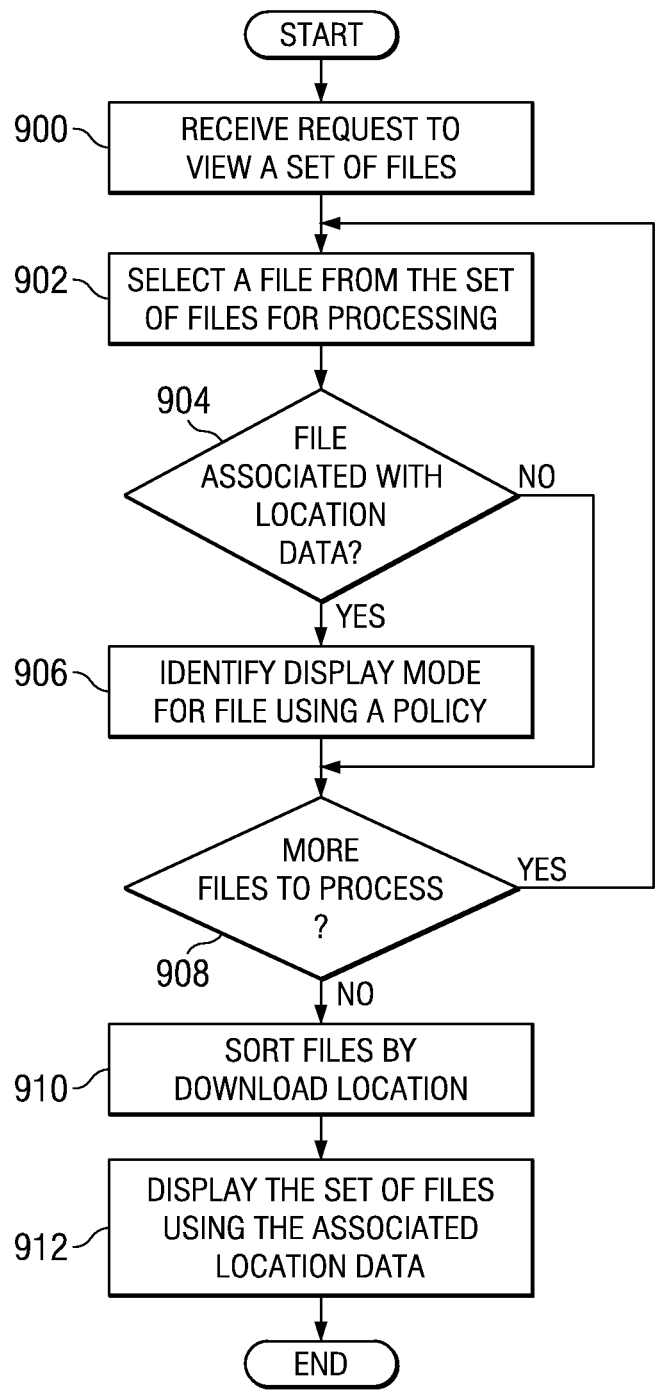

ORGANIZING FILES BASED ON DOWNLOAD LOCATIONS

BACKGROUND OF THE INVENTION

1. Field of the Invention

The present invention relates generally to an improved data processing system and in particular a method and apparatus for organizing data. Still more particularly, the present invention relates to a computer implemented method, apparatus, and computer usable program code for organizing files based on the download location of the files.

2. Description of the Related Art

With the Internet, any computer may communicate with any other computer over the Internet using a variety of languages. These languages also are referred to as protocols. The set of protocols used on the Internet is called transmission control protocol/Internet protocol (TCP/IP). The Internet has revolutionized communications in commerce. For many users, e-mail is a widely used format to communicate over the Internet. Additionally, data is often transferred over the Internet. Users may obtain programs as well as data files over the Internet. The transfer of this type of data is typically facilitated through the hypertext transfer protocol (HTTP).

In downloading applications and files, a user may download files from various sources. One common occurrence of downloading is when a user downloads a plug-in to access websites or when a user installs programs, such as games, freeware, and shareware from different sites on the Internet.

Currently, these files are typically downloaded into a particular directory or folder for installation. When these files are downloaded, they are not organized based on the particular site from which the files were obtained. For example, operating system patches from an operating system vendor are downloaded into a folder designated for the particular operating system. Identifying the downloaded files based on the location from where they were downloaded is currently unavailable.

Often times, however, a business will repackage these files specifically for use by its employees or customers. When the operating system files are downloaded from the business rather than the operating system vendor, these files are typically placed into the folder for the operating system. As a result, identification of the source from where the files were received is unavailable. As another example, plug-ins often may be downloaded from different sites other than the vendor or creator of the plug-in. These plug-ins are typically organized based on the vendor rather than the source of the plug-in. When the source from which the files were downloaded is unknown, the user is often unable to determine whether the files should be trusted. For example, files downloaded from an employer's site are considered to be trusted while files downloaded from a freeware site may be less trustworthy. Knowing the download location of a file is often desirable because a user may not want to run or use files that are from unknown or questionable sources when at work or connected to a network for the user's employer. The user may wish to run a monitoring program or firewall when a file from a questionable or unknown source is executed to ensure that malicious processes do not run or are stopped.

SUMMARY OF THE INVENTION

The illustrative embodiments provide a computer implemented method, apparatus, and computer usable program code for managing files. A set of origination locations for a plurality of files is identified to form a set of identified origination locations in response to a request to view the plurality of files. Each origination location in the set of identified origination locations identifies a location from which a file in the plurality of files has been received. A representation of the plurality of files is presented using a set of graphical indicators based on the set of identified origination locations.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 is a flowchart of a process to display a set of files using the associated location data in accordance with an illustrative embodiment.

DETAILED DESCRIPTION OF THE PREFERRED EMBODIMENT

Figure 1:
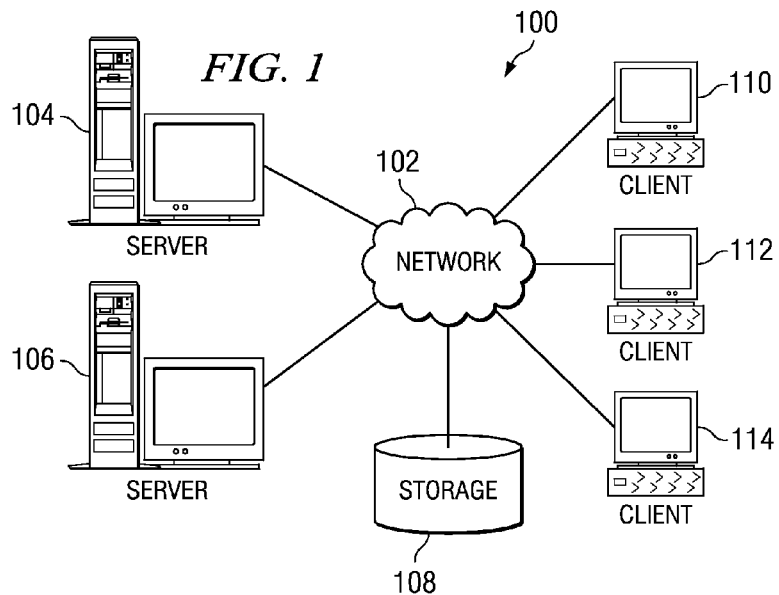
FIG. 1 depicts a pictorial representation of a network of data processing systems in which illustrative embodiments may be implemented.
Figure 2:
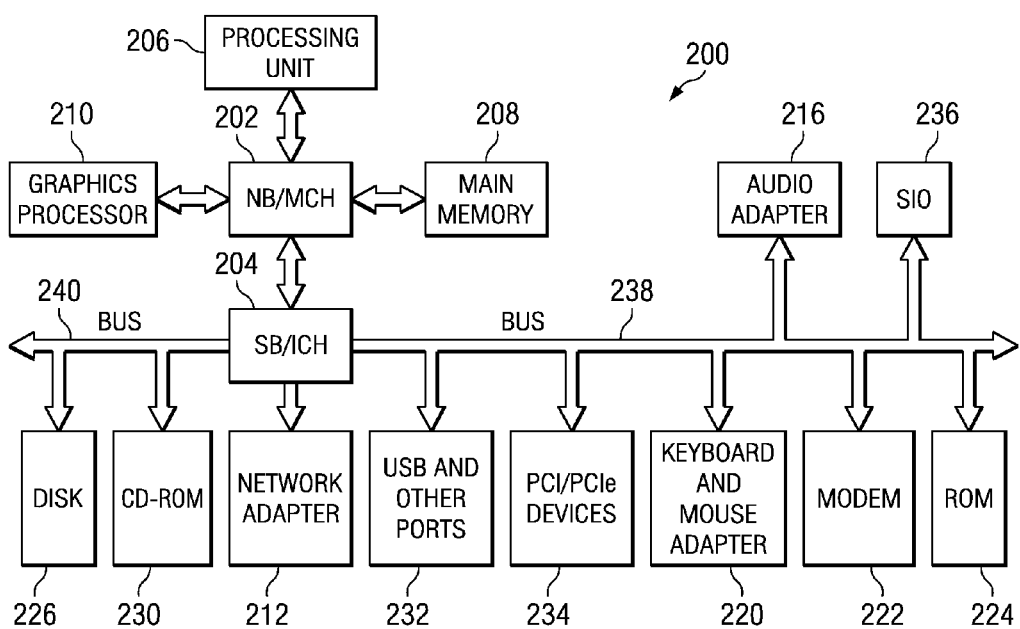
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, apparatus, and computer usable program code for managing files. A set of origination locations for files are identified in response to a request to view the files. The set of origination locations is one or more locations. Each origination location in the set of origination locations identifies a location from which a file in the files has been received. In other words, the origination location is a download location. A representation of these files is presented using a set of one or more graphical indicators or based on the set of origination locations for the files.

The origination locations for files are identified when files are downloaded in these examples. The presentation of the files using graphical indicators may take various forms. For example, the different locations may be identified using a set of colors, different icons, or a set of alpha-numeric characters.

Figure 3:
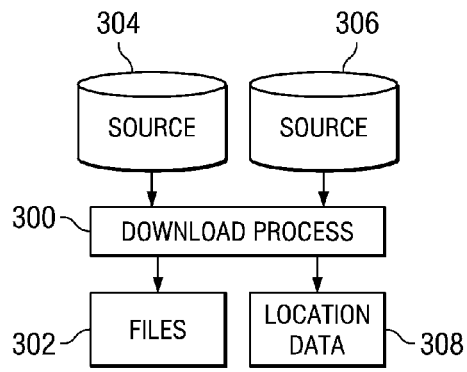
FIG. 3 is a diagram illustrating components used for identifying the location of files in accordance with an illustrative embodiment.

Turning now to FIG. 3, a diagram illustrating components used for identifying the location of files is depicted in accordance with an illustrative embodiment. In this illustrative example, download process 300 downloads or receives files 302 from sources, such as source 304 and source 306. As these files are downloaded, the user may be given an option to have the files 302 associated with a graphical indicator, such as color codes, based on the origination of these files from source 304 and source 306.

The information regarding the location of the files 302 is identified and stored in location data 308. The location information is identified from the universal resource locator (URL) in these examples. The universal resource locator from which a file is obtained is compared to a list or database of universal resource locator that are correlated to known sources. For example the universal resource locator having a domain name, such as abc.com, is associated with a company called ABC, Inc. In addition or in place of identifying the source based on the universal resource locator, the different embodiments may associate the download location with a trust level for security purposes. If the user selects to use this option, the download location is captured as metadata and stored in location data 308.

For example, if the user obtains plug-ins from source 304, the identification of the location of source 304 is stored in location data 308 as the plug-ins are stored or received as files 302. The location is stored in association with an identification of the file in location data 308. If the user obtains a freeware or shareware application from source 306, the identification of that location is stored in location data 308 as the files for the freeware or shareware application are received in files 302. As a result, each file in files 302 is associated with the location of source 304 or source 306 in location data 308, in these examples.

In this manner, a representation of files 302 may be presented using graphical indicators. In addition to this type of organization mechanism, the different illustrative embodiments also may allow for files to be sorted based on the download location. A legend identifying the different graphical indicators also may be presented to allow the user to easily identify the location of different files.

Download process 300 may be implemented as a separate application or part of another application. For example, download process 300 may be implemented in a web browser. Further, download process 300 also may be placed into an operating system as an operating system feature depending on the particular implementation.

Figure 4:
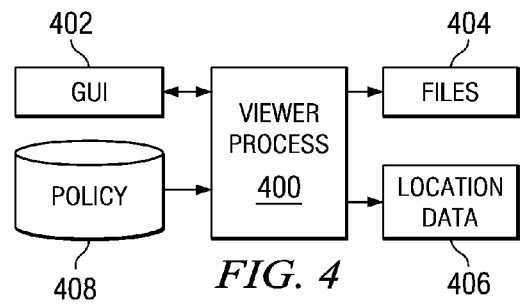
FIG. 4 is a diagram illustrating components used for viewing files based on download locations in accordance with an illustrative embodiment.

Turning now to FIG. 4, a diagram illustrating components used for viewing files based on download locations is depicted in accordance with an illustrative embodiment. Viewer process 400 is initiated in these examples when a user input is received at graphical user interface (GUI) 402 to display files 404. In these examples, viewer process 400 uses metadata stored in location data 406 to identify the download location of files 404 in response to a user request to view files 404. This request may be made in a number of different ways through GUI 402. For example, the user may select entries from a start menu to display program or document files. Alternatively, the user may use an explorer program to display files and folders.

Files 404 are presented in GUI 402 using a representation of the files. This representation is typically an icon with text. In these examples, the representation of the files is altered or modified to identify the location from which the location have been received or downloaded. The particular manner in which the graphical indicators are selected is based on policy 408, in these examples. Policy 408 may be, for example, a set of rules designating color coding for different download locations. Policy 408 may be preset or selected based on user input, depending on the particular implementation.

A user may select using color coding to present files 404 through GUI 402. The user also may select the particular color coding for each particular location in location data 406. These types of selections may form a set of rules in policy 408 for presenting files 404. Depending on the particular implementation, the user may be presented with other types of graphical indicators other than colors when viewing files. For example, an additional icon may be embedded within the graphical representation of a file depending on the location from which the file was received. Another option the user may set through GUI 402 is to sort the files based on the download location. Further, the user also may select to display a legend for the different graphical indicators to be presented with the files in GUI 402.

Figure 5A:
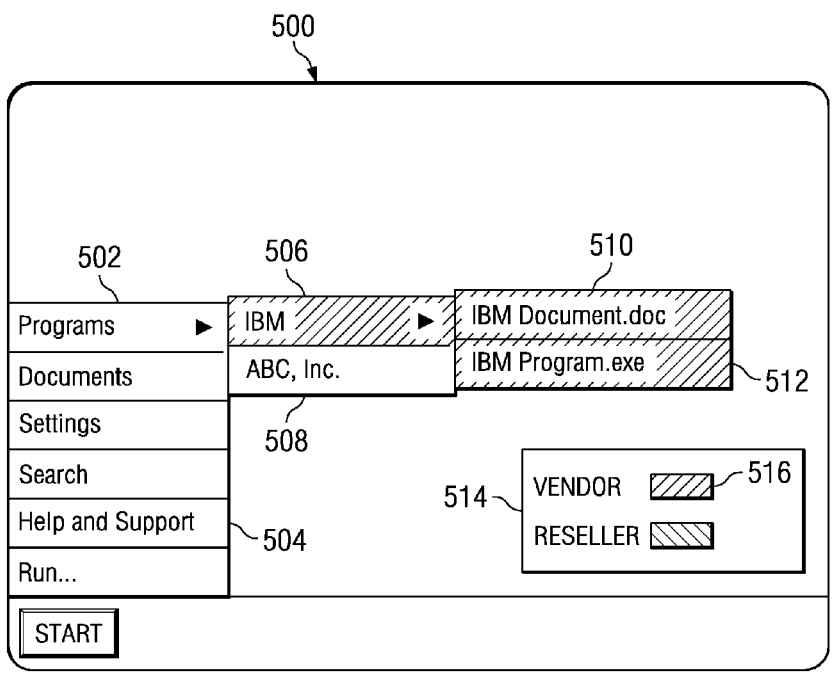
FIGS. 5A and 5B are diagrams illustrating a display of files in accordance with an illustrative embodiment.
Figure 5B:
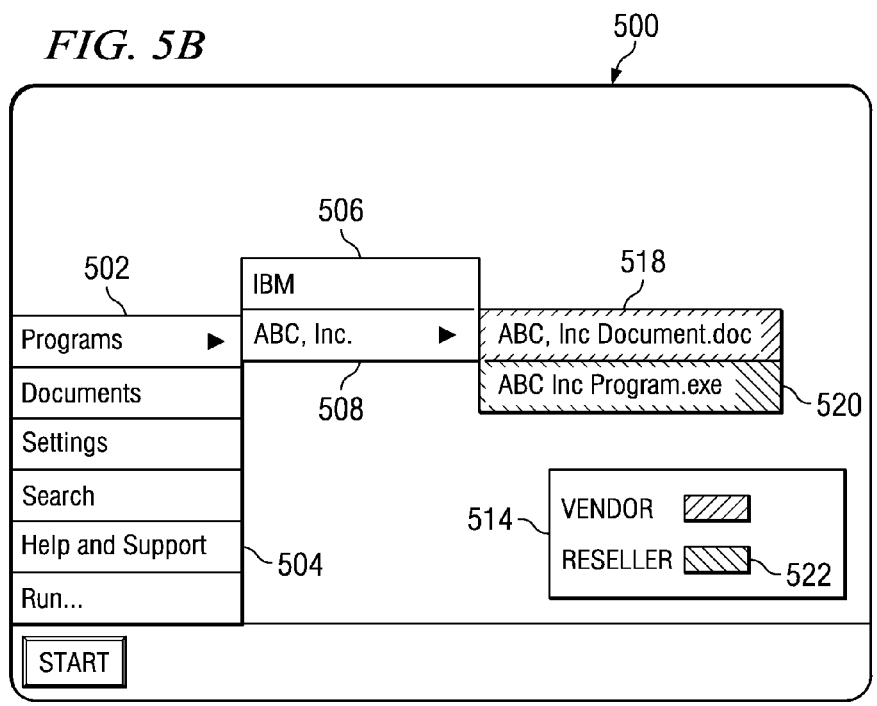

Turning now to FIGS. 5A and 5B, diagrams illustrating a display of files are depicted in accordance with an illustrative embodiment. In this illustrative example in FIG. 5A, display 500 shows a program listing through program 502 in start menu 504. In this example, program 502 contains two groupings: IBM 506 and ABC, Inc 508. Each of these groupings contains a listing of files, such as programs, documents, or other types of files. In this example, the user has moved a pointer over IBM 506 to display files within this grouping.

IBM 506 contains IBM Document 510 and IBM Program 512. In these examples, the display of these files is presented using a graphical indicator to identify the source from which the files were received. In other words, the graphical indicator identifies the download location of the files. In these examples, the graphical indicator is a color coding as illustrated by the cross hatching in the graphical representation of IBM Document 510 and IBM Program 512. Legend 514 identifies the location or source of these files. In this example, vendor 516 is the source of IBM Document 510 and IBM Program 512.

Many times, the source or download location of the files is different from the company or organization that created the program or document. For example, an employee may download operating system patches from the employer's internal website or intranet rather than directly from the operating system vendor that created the files. Such a download is often made because the employer may make slight modifications or additions to the package tailored specifically for the internal architecture of the company. The identification of the download location makes determining whether files are trusted files easier for the user.

In FIG. 5B, the user has moved the pointer over ABC, Inc 508. This causes the display of files within this grouping. These files include ABC, Inc Document 518 and ABC, Inc Program 520. In this example, ABC, Inc Document 518 is displayed using the same graphical indicator or color as with IBM Document 510 and IBM Program 512. This indicates that this file was received from vendor 516. ABC, Inc Program 520, however, is displayed using a different color coding as indicated by the cross hatching for ABC, Inc 520. This color coding indicates that the file was received from reseller 522 rather than vendor 516. In this manner, color coding is used along with legend 514 to identify the download locations of the files in the different groupings.

Additionally, in FIGS. 5A and 5B, groupings of files also may be associated with an indication of the source from which the files were received. In this example, IBM 506 indicates that the files were received from vendor 516. ABC, Inc 508 does not contain a graphical indication in this example. A graphical indication is not provided because ABC, Inc 508 contains files from more than one download location.

With a color coding system for files being downloaded, the actual site may be identified using a name for the site or the entity that provides the files at that site. Additionally, the source from which files have been received may be identified using a designation that may encompass more than one site. For example, green may be used for a downloaded file from a trusted site, red for a file downloaded from a freeware site, yellow for a file downloaded from a shareware site, blue for a file downloaded from a browser plug-in site, orange for a file downloaded from an unknown site, and white for a file that is not downloaded. White would indicate, for example, a file that is part of the original operating system installation.

In addition to color coding the graphical representation of the file, the text could be in a user defined color according to some legend or association scheme.

Figure 6:
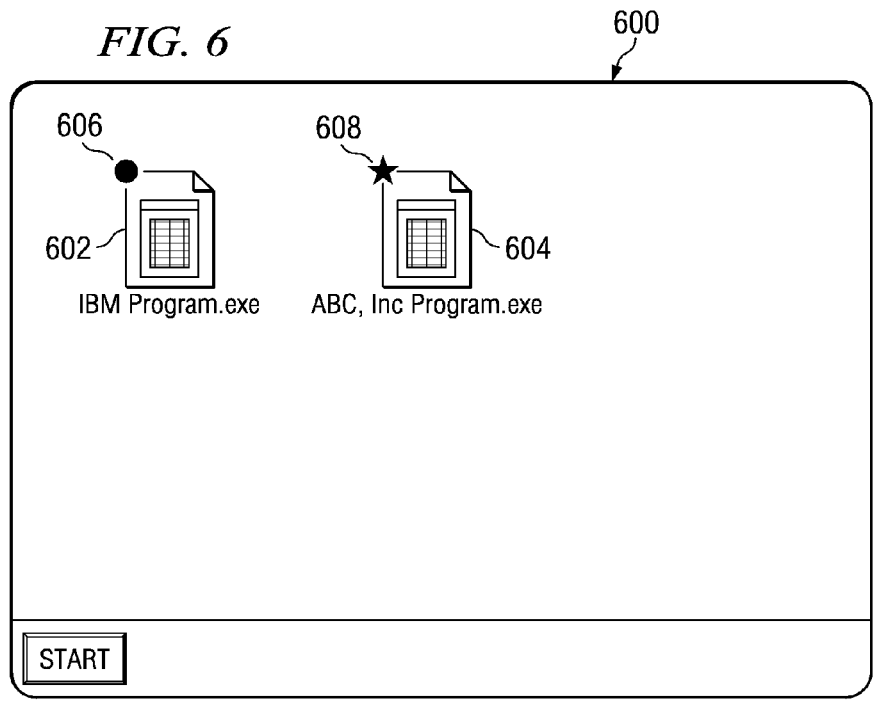
FIG. 6 is a diagram illustrating a designation of locations for files in accordance with an illustrative embodiment.

Turning now to FIG. 6, a diagram illustrating a designation of locations for files in accordance with an illustrative embodiment. In this figure, display 600 is a desktop containing IBM Program 602 and ABC, Inc Program 604. In this example, the graphical indicator takes the form of an icon that is displayed in association with the representation of the program on display 600. IBM Program 602 is displayed in association with circle 606 while ABC, Inc Program 604 is displayed in association with star 608.

Figure 7:
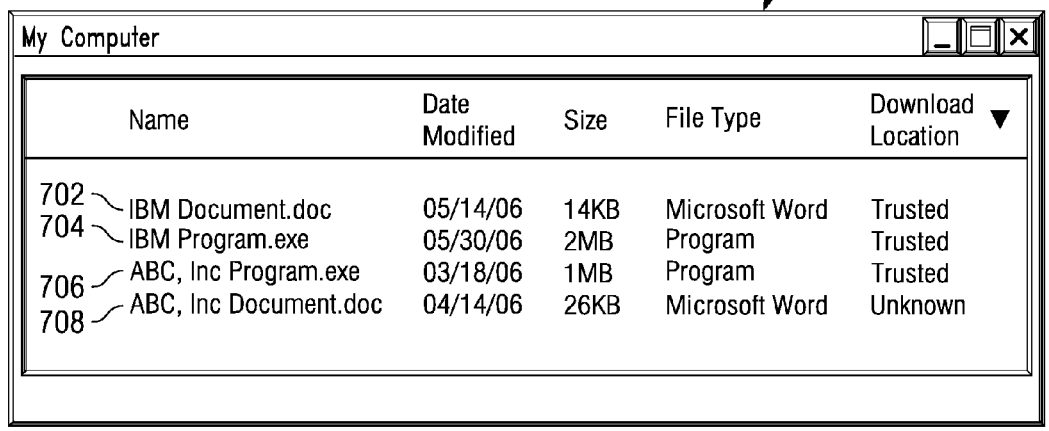
FIG. 7 is a diagram illustrating a listing of files sorted based on download location in accordance with an illustrative embodiment.

Turning now to FIG. 7, a diagram illustrating a listing of files sorted based on download location is depicted in accordance with an illustrative embodiment. In this example, window 700 is a listing of files. IBM Document 702, IBM Program 704, ABC, Inc Document 708 and ABC, Inc Program 706 are displayed with details in this example. Each entry contains, in addition to the name of the file, the date the file was modified, the size of the file, the file type, and a download location. The different illustrative embodiments add this additional detail to help a user identify the source or download location of files. In this particular example, instead of displaying the actual download location, the download location is associated with an identification of the type of site. For example, IBM Document 702 is from a trusted site while ABC, Inc Document 708 is from an unknown site.

Figure 8:
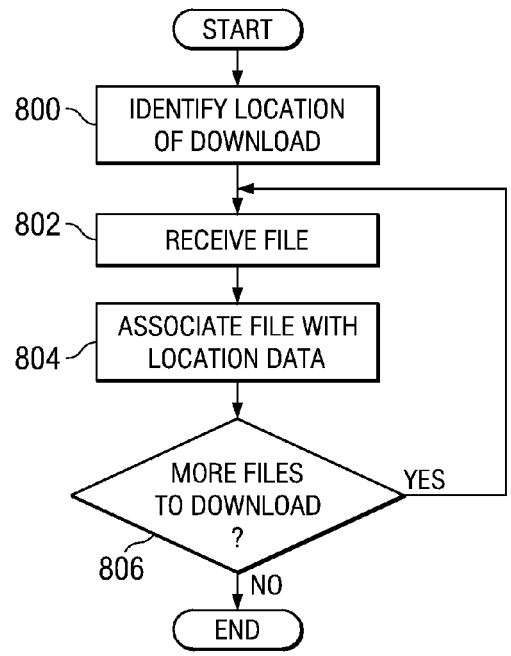
FIG. 8 is a flowchart of a process to identify and associate location data with downloaded files in accordance with an illustrative embodiment.

Turning now to FIG. 8, a flowchart of a process to identify and associate location data with downloaded files is depicted in accordance with an illustrative embodiment. The process illustrated in FIG. 8 is an example of a process that may be implemented in download process 300 in FIG. 3.

The process begins by identifying the location of the download (step 800). Next, the process receives the file (step 802). Then, the process associates the file with location data (step 804). Finally, the process determines whether more files are present to download (step 806). If the process determines more files are present to download in step 806, the process returns to step 802 to receive the files. If the process determines no more files are present to download in step 806, the process terminates.

Turning now to FIG. 9, a flowchart of a process to display a set of files using the associated location data is depicted in accordance with an illustrative embodiment. The flowchart in FIG. 9 illustrates a process that may be implemented in viewer process 400 in FIG. 4.

The process begins by receiving a request to view a set of files (step 900). In step 900, the request may originate from a user input selecting entries in a start menu or a user initiating an explorer program to view files. Next the process, selects a file from the set of files for processing (step 902). The process determines if the file is associated with location data (step 904). This determination is made using location data, such as location data 406 in FIG. 4. If the file is associated with location data in step 904, the process identifies a display mode for the file using a policy, such as policy 408 in FIG. 4 (step 906).

Then, the process determines more files are present to process (step 908). If more files are not present to process, the files are sorted by download location (step 910), and the set of files are displayed using the associated location data (step 912) with the process terminating thereafter.

Turning back to the determination made in step 908, if the process determines that more files are present to process, the process returns to step 902. Turning further back to the determination made in step 904, if the process determines that the file is not associated with location data, the process proceeds to step 908 and continues as described above.

Thus, the present invention provides a computer implemented method, apparatus, and computer usable program code for managing files. In response to a request to view files, origination locations for the files are identified. Each origination location identifies a location from which a file has been received. Representations of the files are presenting using a set of graphical indicators based on the origination locations. As a result, a user is able to present files based on their download location. In the depicted examples, the files are presented using graphical indicators in the form of color coding. Of course, any type of graphical indication may be used to differentiate files based on download location.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing files, the computer implemented method comprising:
   responsive to a request to view a plurality of files, identifying a set of origination locations for the plurality of files to form a set of identified origination locations, wherein each origination location in the set of identified origination locations identifies a location on a network from which a file in the plurality of files has been received; and
   presenting a representation of the plurality of files in using a set of graphical indicators based on the set of identified origination locations.

2. The computer implemented method of claim 1 further comprising:
   responsive to a request to download a set of files for a location, presenting an option to a user allowing the user to associate the set of files with a graphical indicator for the location.

3. The computer implemented method of claim 1, wherein the set of graphical indicators is at least one of a set of colors, a set of icons, and a set of alphanumeric characters as determined by a policy that is selected based on user input.

4. The computer implemented method of claim 3 further comprising:
   displaying a legend providing a correlation between the set of graphical indicators and the set of identified origination locations, wherein the set of graphical indicators is the set of colors.

5. The computer implemented method of claim 1, wherein the set of origination locations is a single website location that is identified based on a uniform resource locator (URL) of the single website.

6. The computer implemented method of claim 1 further comprising:
   sorting the plurality of files based on the set of identified origination locations, wherein the set of origination locations for the plurality of files are identified when the plurality of files are downloaded.

7. The computer implemented method of claim 1 further comprising:
   assigning the set of graphical indicators and trust levels to the plurality of files based on the set of identified origination locations.

8. A computer program product that is operable by a data processing system for managing files, comprising:
   a non-transitory computer readable medium having computer usable program code tangibly embodied thereon, the computer program medium comprising:
   computer usable program code, responsive to a request to view a plurality of files, for identifying a set of origination locations for the plurality of files to form a set of identified origination locations, wherein each origination location in the set of identified origination locations identifies a location on a network from which a file in the plurality of files has been received; and
   computer usable program code for presenting a representation of the plurality of files in using a set of graphical indicators based on the set of identified origination locations.

9. The computer program product of claim 8 further comprising:
   computer usable program code, responsive to a request to download a set of files for a location, for presenting an option to a user allowing the user to associate the set of files with a graphical indicator for the location.

10. The computer program product of claim 8, wherein the set of graphical indicators is at least one of a set of colors, a set of icons, and a set of alphanumeric characters as determined by a policy that is selected based on user input.

11. The computer program product of claim 10 further comprising:
    computer usable program code for displaying a legend providing a correlation between the set of graphical indicators and the set of identified origination locations, wherein the set of graphical indicators is the set of colors.

12. The computer program product of claim 8, wherein the set of origination locations is a single website location that is identified based on a uniform resource locator (URL) of the single website.

13. The computer program product of claim 8 further comprising:
    computer usable program code for sorting the plurality of files based on the set of identified origination locations, wherein the set of origination locations for the plurality of files are identified when the plurality of files are downloaded.

14. The computer program product of claim 8 further comprising:
    computer usable program code for assigning the set of graphical indicators and trust levels to the plurality of files based on the set of identified origination locations.

15. A data processing system comprising:
    a bus;
    a communications unit connected to the bus;
    a storage device connected to the bus, wherein the storage device includes computer usable program code; and
    a processor unit connected to the bus, wherein the processor unit executes the computer usable program code to identify a set of origination locations for the plurality of files to form a set of identified origination locations in response to a request to view a plurality of files, wherein each origination location in the set of identified origination locations identifies a location on a network from which a file in the plurality of files has been received; and present a representation of the plurality of files in using a set of graphical indicators based on the set of identified origination locations.

16. The data processing system of claim 15 wherein the processor unit further executes the computer usable program code to present an option to a user allowing the user to associate the set of files with a graphical indicator for the location in response to a request to download a set of files for a location.

17. The data processing system of claim 15, wherein the set of graphical indicators is at least one of a set of colors, a set of icons, and a set of alphanumeric characters as determined by a policy that is selected based on user input.

18. The data processing system method of claim 17, wherein the processor unit further executes the computer usable program code to display a legend providing a correlation between the set of graphical indicators and the set of identified origination locations, and wherein the set of graphical indicators is the set of colors.

19. The data processing system of claim 15, wherein the set of origination locations is a single website location that is identified based on a uniform resource locator (URL) of the single website.

20. The data processing system of claim 15 wherein the processor unit further executes the computer usable program code to sort the plurality of files based on the set of identified origination locations, wherein the set of origination locations for the plurality of files are identified when the plurality of files are downloaded.

* * * * *